United States Patent [19]
Fujioka et al.

[11] Patent Number: 5,149,177
[45] Date of Patent: Sep. 22, 1992

[54] AUTOMOTIVE WHEEL SPEED CONTROL

[75] Inventors: Hideaki Fujioka; Koji Takata, both of Itami, Japan

[73] Assignee: Sumitomo Electric Industries, Ltd., Osaka, Japan

[21] Appl. No.: 139,850

[22] Filed: Dec. 30, 1987

[30] Foreign Application Priority Data

Jan. 9, 1987 [JP] Japan ..................... 62-3802

[51] Int. Cl.⁵ .................. F02D 29/02; B60K 28/16
[52] U.S. Cl. .......................... 303/110; 180/197
[58] Field of Search ............. 303/107, 105, 108, 96, 303/97, 20; 180/197, 176

[56] References Cited

U.S. PATENT DOCUMENTS

| | | | |
|---|---|---|---|
| 3,169,595 | 2/1965 | Shepard | 180/271 |
| 3,680,655 | 8/1972 | Beyerlein et al. | 180/54.1 |
| 3,938,611 | 4/1976 | Beltolasi | 180/192 |
| 4,361,871 | 11/1982 | Miller et al. | 180/197 |
| 4,583,173 | 4/1986 | Odlen et al. | 180/197 |
| 4,583,611 | 4/1986 | Frank et al. | 180/197 |
| 4,701,682 | 10/1987 | Hirotsu et al. | 180/197 |
| 4,701,855 | 10/1987 | Fennel | 180/197 |
| 4,721,176 | 1/1988 | Kabasin et al. | 180/197 |

FOREIGN PATENT DOCUMENTS

| | | |
|---|---|---|
| 0993984 | 7/1976 | Canada .................... 303/107 |
| 3011541 | 1/1983 | Fed. Rep. of Germany . |
| 2509242 | 10/1981 | France . |
| 62-60937 | 3/1987 | Japan . |
| 63-141684 | 6/1988 | Japan . |

Primary Examiner—Matthew C. Graham
Attorney, Agent, or Firm—Cushman, Darby & Cushman

[57] ABSTRACT

A wheel speed control apparatus for controlling a braking force and/or a driving force transmitted to wheels maintains the difference between the peripheral speed of each of the wheels and the vehicle running speed or an inferred value thereof at a value approximating the optimum value. The apparatus includes a normal control that detects and controls the increase or incipient increase of the difference over the absolute value using a differential value of the difference and difference or the rotational speed of the wheels. An integrating control detects and controls the continuation for a certain period of slightly excessive tendency of the absolute value of the difference, by comparing with a predetermined threshold value one of values which is smaller than the value with which, when the differential value is zero, the normal control would determines the excessive different only with the absolute value.

18 Claims, 6 Drawing Sheets

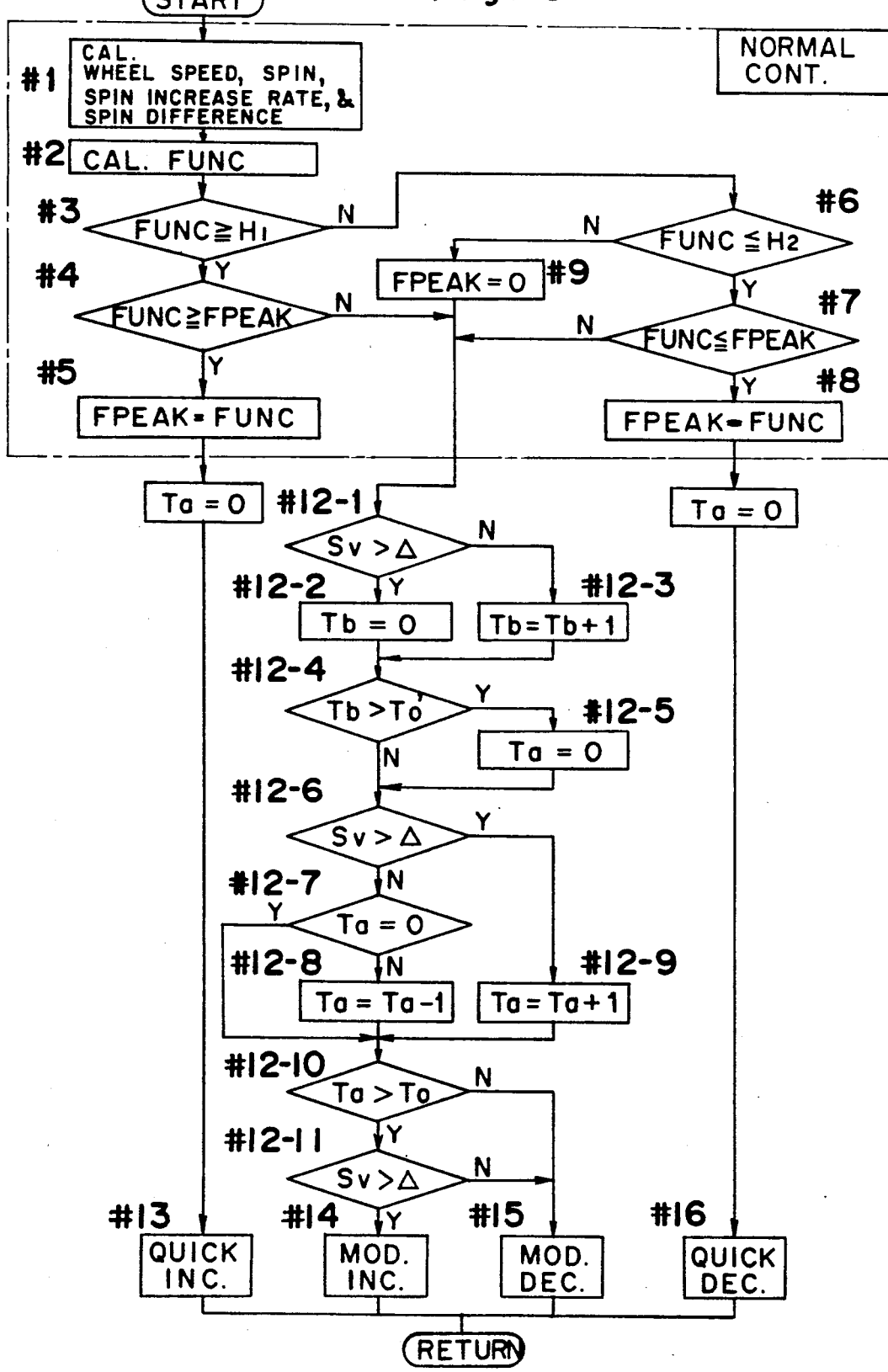

AUTOMOTIVE WHEEL SPEED CONTROL

BACKGROUND OF THE INVENTION

1. Field of the Invention

The present invention relates to a control system for controlling the rotational speeds of wheels in automotive vehicles and, more particularly, to the control system such as, for example, anti-lock controllers and traction controllers designed to control braking forces or driving forces applied to wheels that avoid excessive increases in the absolute value of the difference between the wheel rotational speeds and the vehicle running speed, or the appropriately inferred or representative value thereof.

2. Background Information

The prior art wheel speed control system, which is employed, for example, in an anti-lock controller or a traction controller, generally makes two decisions: a decision to determine if the absolute value of the degree of acceleration of the wheel rotational speeds has exceeded a certain limit; and a decision to determine if the absolute value of the difference between the wheel rotational speeds and the vehicle running speed has exceeded a certain limit.

According to the prior art wheel speed control system, when a slightly excessive braking force or a slightly excessive driving force is applied continuously while driving on a road, the frictional force between the wheel tires and the road surface is excessively small, such as when driving on a slippery road due to the presence of, for example, ice. During this time, the absolute value of the difference between the wheel rotational speeds and the vehicle running speed increases only moderately, resulting in a delay of the detection of slip or skid.

More specifically, where the absolute value of the wheel acceleration is zero or very small, the slip or skid cannot be detected unless the absolute value of the difference exceeds a threshold value. When noise components contained in the wheel rotational speeds are taken into consideration, the above-mentioned threshold value cannot be reduced.

Although this problem would bring about relatively little harm in practice in the case of the anti-lock controller because the slightly excessive braking force will not be applied continuously for a prolonged time, this problem cannot be neglected in the case of the traction controller.

SUMMARY OF THE INVENTION

The present invention, in addition to the conventionally employed criterion for decision which uses a first control means previously described, uses an integrating element or a second control means for detecting a moderate increase of the absolute value of the difference between the wheel rotational speeds and the vehicle running speed.

The integrating element uses an index representative of, for example, the absolute value of the difference increasing over a predetermined threshold value for a time greater than a predetermined time, or representative of, for example, the situation in which the balance between the time during which the absolute value of the difference exceeds the threshold value and the time during which it does not exceed prolongs a predetermined time.

The integrating element for the detection of the moderate variation is applicable in any field of technology of the wheel speed control system. It can be used in the field of anti-lock control for relieving the braking force to suppress excessive braking forces and in the field of traction control when applying braking forces to suppress excessive driving forces or relieving the driving force of a prime mover. The integrating element can bring about outstanding effects particularly when applied to traction control, specifically to the control for applying the braking force to the driven wheels if integrating detection is made to the difference between the non-driven wheel speeds and the inferred vehicle running speed of each driven wheel speed.

Because the driven wheels are coupled with each other through a differential gear mechanism, when a moderate increase of the difference takes place, the difference associated with one of the driven wheels increases and the difference associated with the other of the driven wheels decreases.

Since the difference between the actually generated deference and an ideal difference providing a target to be controlled may be positive for one wheel and negative for the other, the behavior of the wheels exhibiting the increased difference can be detected with a sensitivity of a factor of about 2 when the difference of the differences is taken into consideration so that an appropriate braking force can be applied to the wheels exhibiting the increased difference.

Also, when the automotive vehicle is cornering, the mere detection of the difference in speed between the driven wheels and the non-driven wheels would be difficult. Even though the rotational speeds of wheels on the same side are compared, the difference in speed occurring between the driven wheels and the non-driven wheels is not great. Accordingly, particularly where the automotive vehicle is of a front wheel drive type, the positive difference generated between the driven wheels and the non-driven wheels is small. However, when the difference in speed between the non-driven wheels is subtracted from the difference in speed between the driven wheels, any possible influence brought about by the difference between the front and rear wheels during the cornering of the automotive vehicle is negligible. Therefore, the actual excessive increase of the driving force can be detected. This means that the difference of the differences, i.e., the difference between the left-hand driven and non-driven wheels subtracted by the difference between the right-hand driven and non-driven wheels can be used as a target to be controlled by the second control means.

Furthermore, when the difference between the drive and non-driven wheels on the same sides is generated, is negative and is reduced to zero, external disturbance recognition is enhanced.

A combination of the detection of a large difference itself for each wheel, that is, for each driven wheel and the detection of a large differential value of the difference reduces possible influence brought by a cornering of an automotive vehicle to negligible amount by properly providing an excess detection threshold value.

When the present invention is used to suppress the driving force of the prime mover during traction control, the average value of the differences between the left-hand and right-hand driven and non-driven wheels or the difference generated from the wheel side exhibiting a smaller value is used as a target to be controlled. The former value is based on the finding that the output of the prime mover can be expressed in terms of the average value of the rotational speeds of the left-hand and right-hand driven wheels through the differential gear mechanism. The latter value is based on the finding that traction control is generally accomplished by simultaneously suppressing the output of the prime mover and controlling the braking force. The control of the difference between the left-hand and right-hand wheels is performed by the braking force control, which has a quick response.

When differences in the coefficient of friction of the road surface between the left-hand and right-hand wheels are taken into consideration, the greatest difference is in the driven wheels on the slippery road surface. Therefore, the braking force is appropriately applied so that the difference may reach a value corresponding to that generated when the driven wheels are on the less slippery road surface. Therefore, the control of the suppression of the output of the prime mover should be directed to the driven wheels on the less slippery road surface.

If the integrating element of the present invention is applied subject to the average value of the differences between the left-hand wheels and between the right-hand wheels or one of the differences which is smaller than the other of the differences, the prolongation for a long time of excessive output of the prime mover can be avoided thereby leading to improvement in steerability and stability. However, since this does not make it possible to distinguish the condition in which the automotive vehicle is cornering, the difference, which is a target to be controlled, or the threshold value has to be corrected with the difference in speed between the left-hand and right-hand non-driven wheels.

Since the threshold value of the difference related to the integrating element requires a smaller value than the difference (not the differential value) related to normal control, it is preferred to effectuate cornering correction. (In this respect, the difference of the differences used in the braking force control of the previously mentioned traction control is somewhat automatically corrected for the cornering and is, therefore, advantageous).

The application of the present invention during the anti-lock control will be discussed.

The target of anti-lock control is based on the difference between the rotational speeds of the wheels and the inferred vehicle running speed. It is usual to add the degree of acceleration of the wheels to the target of anti-lock control.

In anti-lock control, there are many uncertain elements including the preciseness of the inference of the vehicle running speed, as compared with traction control. Thus, the absolute value of the threshold value must take a great value.

Yet, since the braking force is applied to all four wheels and the wheels exhibit a complicated behavior in view of the frictional retaining force of the road surface on which each of these wheels is held, a numerical value that can be used as reference for the cornering correction can hardly be obtained. (What may be termed left-hand and right-hand non-braked wheels that possibly corresponds to the left-hand and right-hand non-driven wheels in the case of the traction controller does not exist).

Accordingly, in anti-lock control it is difficult for the cornering correction to have a sufficiently practical value with information of wheel rotational speeds and, therefore, it must be omitted (unless the use is made of a lateral accelerometer or a steering angle measuring instrument).

Thus, emphasis is placed on the degree of acceleration decision, and the absolute value of the threshold value applicable to the difference between the wheels of interest and the inferred vehicle running speed is very important.

Because of the foregoing, it is usual that the detection to be performed when the absolute value of the difference increases moderately while the degree of acceleration is small tends to be delayed considerably.

Accordingly, the presence of the integrating element can reduce the absolute value of the threshold value that is applied to the difference that occurs when the absolute value of the degree of acceleration during normal control is small. Therefore, the integrating element of the present invention becomes effective.

Corrections based on the vehicle running speed are preferably applied to either the differences or the threshold values, all which have been discussed in the foregoing. However, examples of these corrections are well known to those skilled in the art and will not, therefore, be discussed in detail.

BRIEF DESCRIPTION OF THE DRAWINGS

The present invention will become more clearly understood from the detailed description thereof taken in conjunction with preferred embodiments with reference to the accompanying drawings, in which:

FIG. 6 is a flow chart showing an operation of Example (2);

DETAILED DESCRIPTION OF THE PREFERRED EMBODIMENTS

Figure 1:
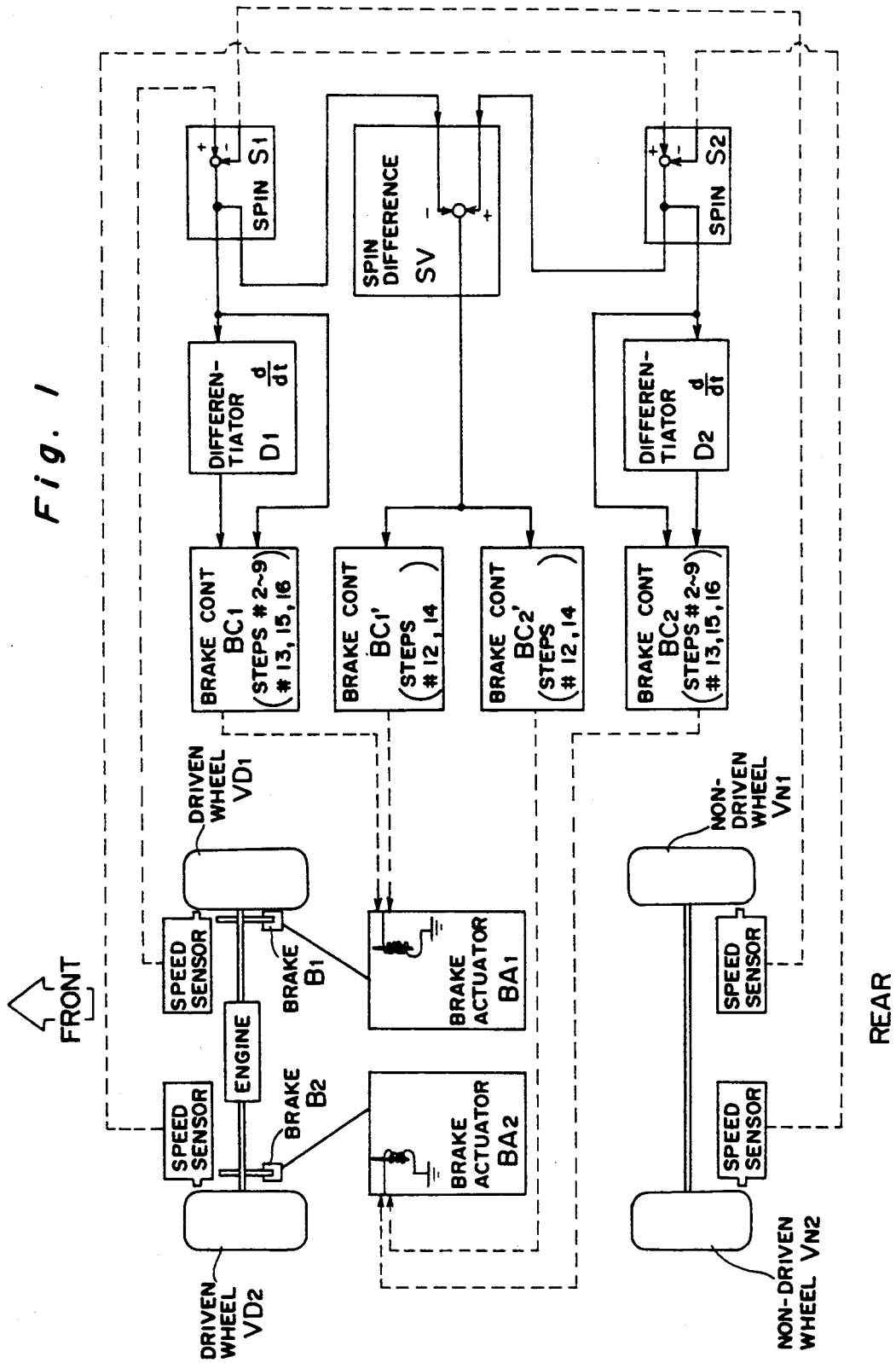
FIG. 1 is a circuit block diagram according to one embodiment of the present invention applied to a braking force control portion of the traction control system.

Referring to FIG. 1, there is illustrated a circuit block diagram showing the present invention applied to a braking force control portion of a traction control apparatus, wherein the difference is represented by a spin. It is to be noted that, in the drawings, numeral "1" or "2" affixed to each of the reference characters used therein indicates one of the opposite sides of an automotive vehicle, for example, the right-hand side or the left-hand side.

Reference character VD represents a speed sensor for detecting the speed of the respective driven wheel, reference character VN represents a speed sensor for detecting the speed of the respective non-driven wheel, and reference character S represents a spin amount output unit for outputting a signal indicative of an amount of spin occurring in the driven wheels. The spin amount output unit may be comprised of, for example, a subtractor capable of calculating a difference between the output from the driven wheel speed sensor VD and the output from the non-driven wheel speed sensor VN. It is, however, to be noted that, although the amount of the wheel spin can be indicated by the difference between the speed of rotation of each of the driven wheels and the vehicle speed, it is desirable to effect a correction to the amount of wheel spin particularly during the cornering of the automotive vehicle. To this end, the difference in speed of rotation between the left-hand and right-hand non-driven wheels, or between the right-hand driven wheels and the right-hand non-driven wheels, may be used as a parameter representative of the amount of cornering error. A method of effectuating such a correction during the cornering of the automotive vehicle is disclosed in, for example, Japanese Patent Application No. 60-201233, filed on Sep. 11, 1985, by the same assignee of the present invention.

However, since the cornering correction is necessitated particularly for counteracting with the moderate increase of difference, the cornering correction can be omitted when the second control means of the present invention is used, so far as the braking force control of the traction control is concerned.

It is also to be noted that, it is desirable to render the output from the spin amount output unit S to be zero in the case where the spin amount output unit S takes a negative plus.

Reference character D represents a spin increase rate output unit which may be comprised of, for example, a differentiator capable of differentiating the output from the spin amount output unit S. Reference character SV represents a spin difference output unit for outputting a difference between the amounts of spin occurring on the respective sides of the automotive vehicle.

Reference character BC represents a first control means for controlling a braking force under the normal control. This controller BC is operable to calculate a control variable, expressed by the following equation, with the use of the signals obtained from the spin amount output unit S and the spin increase rate output unit D, and then to effect the normal control, which is disclosed, for example, in a Japanese Patent Application, entitled "Wheel Spin Control Apparatus" and filed Dec. 2, 1986, in the name of the same assignee of the present invention, the filing number of which has not yet been allocated:

$$FUNC = K_2 \cdot (SPIN + K_1 \cdot DSPIN)$$

wherein $K_1$ and $K_2$ represent predetermined constants, respectively, SPIN represents the output from the spin amount output unit S, and DSPIN represents the output from the spin increase rate output unit D.

Reference character BC' represents a second control means for controlling a braking force under the integrating control which is operable to carry out the integrating control, as will be described later, with the use of a signal obtained from a let-hand and right-hand spin difference output unit SV. It is to be noted that the braking force controllers BC1' and BC2' operate when S1 > S2 and S1 < S2, respectively.

Reference character BA represents a brake actuator operable in response to a command from the braking force controllers BC and BC' to apply or release, or decrease or increase, the braking force, and reference character B represents a brake. Although not shown for the purpose of simplicity, various values, such as coefficients and thresholds used in the braking force controllers BC and BC' can be adjusted based on the vehicle running velocity $$\frac{(VN1 + VN2)}{2},$$

and its differential value.

Figure 2:
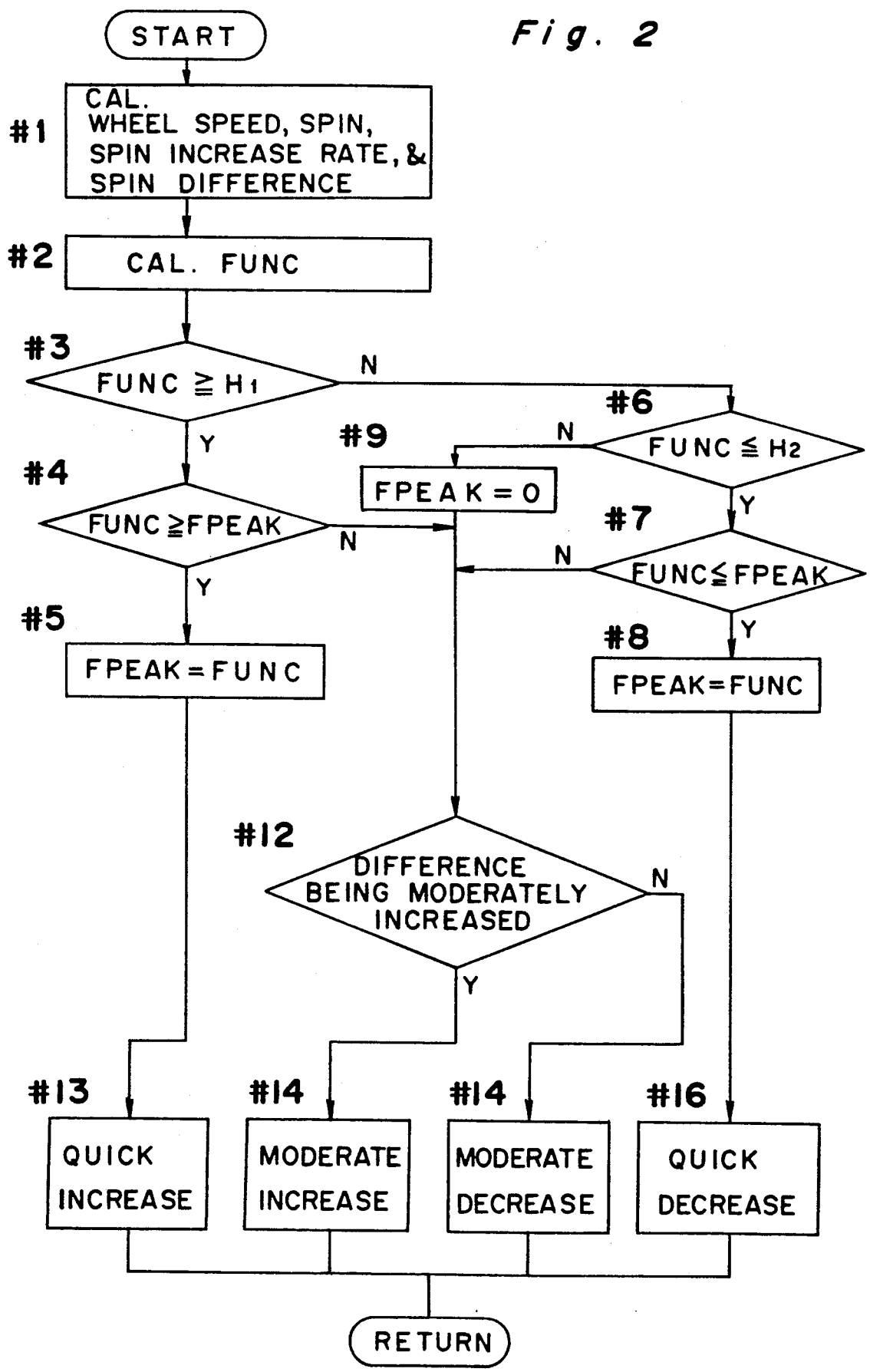
FIG. 2 is a flow chart showing an operation of the embodiment shown in FIG. 1.

The foregoing embodiment described in connection with FIG. 1 can be constructed with a microcomputer, the sequence of operation of which will now be described with reference to a flow chart shown in FIG. 2.

At step #1, a spin amount calculating block S calculates a difference in rotational speed between the driven and non-driven wheels, representing the amount of spin expressed by the following equation:

$$SPIN = VD - VN$$

When this value should take a negative value, it is rendered zero. A spin increase rate calculating block D outputs a differential of the spin amount (VD−VN), that is, the degree of spin acceleration expressed by the following equation:

$$DSPIN = \frac{d}{dt}(VD - VN)$$

A left- and right-hand spin difference calculating block SV calculates a difference in spin between the left-hand and right-hand sides that is expressed by the following equation:

$$S1 - S2$$

At step #2, the braking force controller BC receives the spin (SPIN) and the spin acceleration degree (DSPIN) and then calculates a control variable FUNC expressed by the following equation:

$$FUNC = K_2 \cdot (SPIN + K_1 \cdot DSPIN)$$

wherein $K_1$ and $K_2$ represent predetermined constants, respectively.

Figure 3:
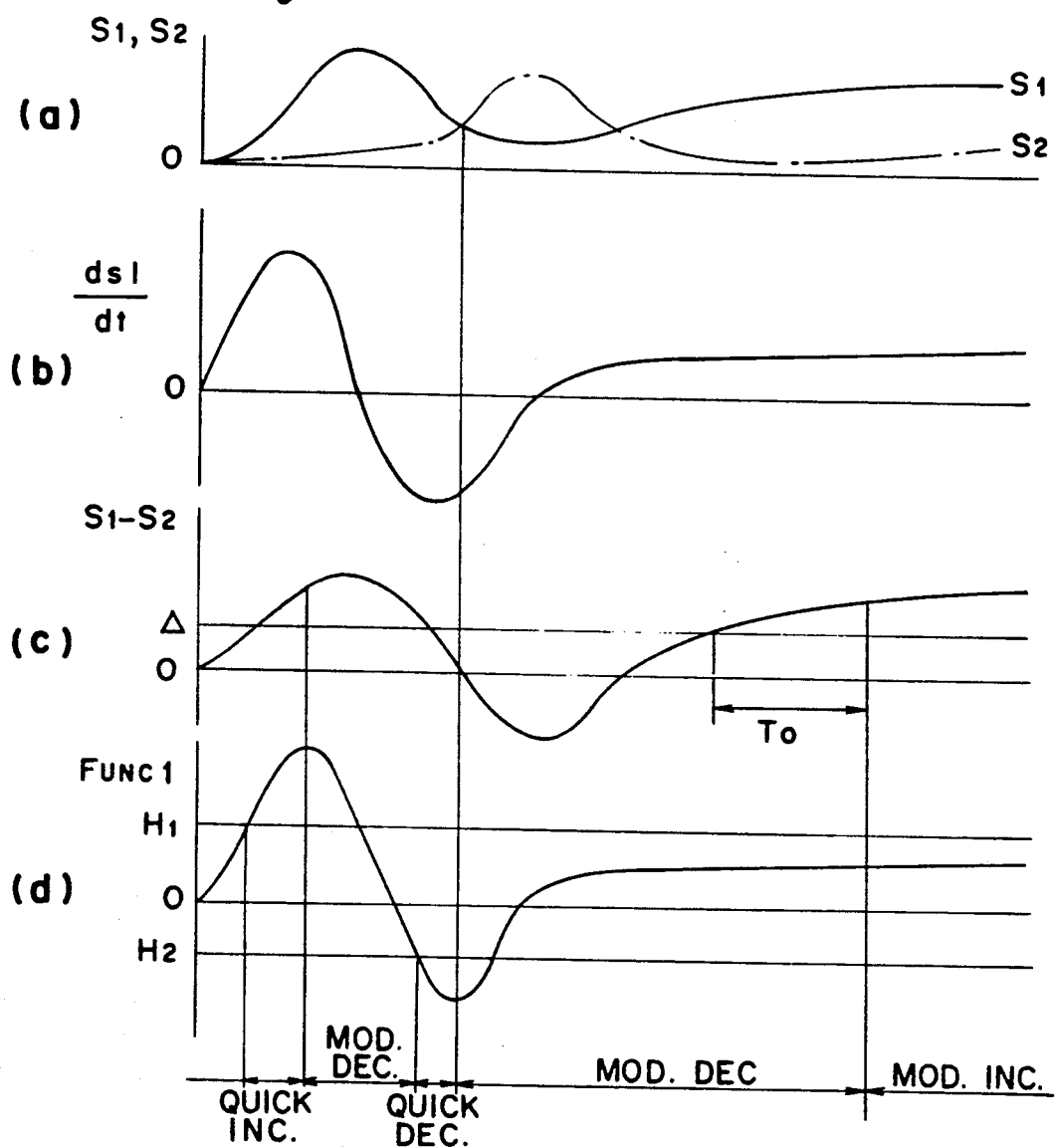
FIGS. 3 and 4 are graphs showing waveforms obtained from the system of FIG. 1 according to Example (1)

Assuming that the amount of spin on the left-hand side and that on the right-hand side have changed as shown by respective curves $S_1$ and $S_2$ in FIG. 3(a), the spin differential value, $dS_1/dt$, will be as shown in the graph of FIG. 3(b) and, at the same time, the control variable FUNC1 will be as shown in the graph of FIG. 3(d). Also, the left-hand and right-hand spin difference SV will be as shown in the graph of FIG. 3(c). Since the control variable FUNC contains a term representing a differential of the spin, a change in spin can be quickly detected.

In addition, since the control variable FUNC has a term representing a spin amount, the differentiated term $$DSPIN = \frac{d}{dt}(VD - VN),$$

is raised up by the spin amount.

At subsequent steps #3 to #8, based on the control variable FUNC, the behavior of the wheels is detected to carry out the normal control. More specifically, at step #3, a decision is made to determine if the control variable FUNC is equal to or greater than a positive threshold value $H_1$. If the control variable FUNC is equal to or greater than the positive threshold value $H_1$, step #4 takes place at which it is compared with a stored maximum value FPEAK of the control variable FUNC, which FPEAK has been stored in the previous cycle. If the newly obtained control variable FUNC is equal to or greater than the stored FPEAK, the newly obtained control variable FUNC is written in FPEAK at step #5. Accordingly, when the program flow proceeds from step #3 to step #5 by way of step #4, it means that the control variable FUNC is increasing in a positive direction above the threshold value $H_1$. In other words, it means that the excessive spin has occurred and is increasing. Under such a circumstance, at step #13, a quick increase command for quickly increasing the braking force is generated. Accordingly, a signal for the abrupt application of pressure is applied to the brake actuator BA to apply a brake thereby to suppress the excessive spin.

On the other hand, if the result of decision at step #4 has indicated that the newly obtained control variable FUNC is smaller than FPEAK, that is, when the control variable FUNC is above the threshold value $H_1$ but is decreasing, the program flow proceeds to a calculating block step #12 corresponding to the braking force controller BC', to effect the integrating control.

In the event that the result of decision at step #3 has indicated that the newly obtained control variable FUNC is smaller than the positive threshold value $H_1$, the program flow proceeds to step #6 at which a decision is made to determine if the control variable FUNC is equal to or smaller than a negative threshold value $H_2$. If the control variable FUNC is equal to or smaller than the negative threshold value $H_2$, step #7 takes place at which it is compared with a stored minimum value FPEAK of the control variable FUNC which has been stored in the previous cycle. In the event that the newly obtained control variable FUNC is equal to or smaller than the minimum value FPEAK (that is, if it is greater than the minimum value FPEAK in a negative direction), the newly obtained control variable FUNC is written in FPEAK at step #8. Accordingly, when the program flow proceeds from step #3 to step #8 by ay of steps #6 and #7, it means that the control variable FUNC is decreasing below the threshold value $H_2$. In other words, it means that the excessive spin is being suppressed. Under such a circumstance, at step #16, a quick decrease command for quickly decreasing the braking force is generated so that the brake can be weakened. If, however, the result of decision at step #6 has indicated that the control variable FUNC is equal to or greater than the negative threshold value $H_2$, that is, when the control variable FUNC takes a value between the threshold values $H_1$ and $H_2$, the program flow proceeds to step #9 to render FPEAK to be $\int 0$", followed by step #12. Thus, when the control variable FUNC is less than a previously obtained positive peak point, or when it is greater than a previously obtained negative peak point, or when the control variable FUNC takes a value between the threshold values $H_1$ and $H_2$, the program flow proceeds to step #12.

The foregoing illustrates an example of the normal control used to control the braking force during the traction control, and step #12 which will be described in detail hereinbelow constitutes the second control means, that is, the integrating control forming the essence of the present invention.

At step #12, a decision is made to determine if there is a tendency of the difference being moderately increased. If the result of decision at step #12 indicates "YES", a moderate increase command for moderately increasing the braking force is generated at step #14 so that a signal for the moderate application of pressure can be outputted to the brake actuator BA thereby to apply the braking force slowly. But if the result of such decision at step #12 indicates "NO", a moderate decrease command for moderately decreasing the braking force is generated at step #15 so that a signal for moderately decreasing the pressure can be outputted to the brake actuator BA thereby to release the braking force slowly. It is to be noted that both of the signal for the abrupt application of pressure and the signal for the moderate application of pressure can be prepared by varying the level of voltage or current applied to a control valve for changing the hydraulic braking pressure. Alternatively, by intermittently outputting the same voltage level signal to a solenoid actuated valve, the ratio between the outputting time and the non-outputting time can be changed. (This is a so-called pulse width modulation control). Other methods can also be employed. The reducing signal for reducing the pressure can be prepared in a manner similar to that described hereinabove.

Three specific examples of the decision made at step #12 forming the essence of the present invention will now be described.

EXAMPLE (1)

Figure 4:
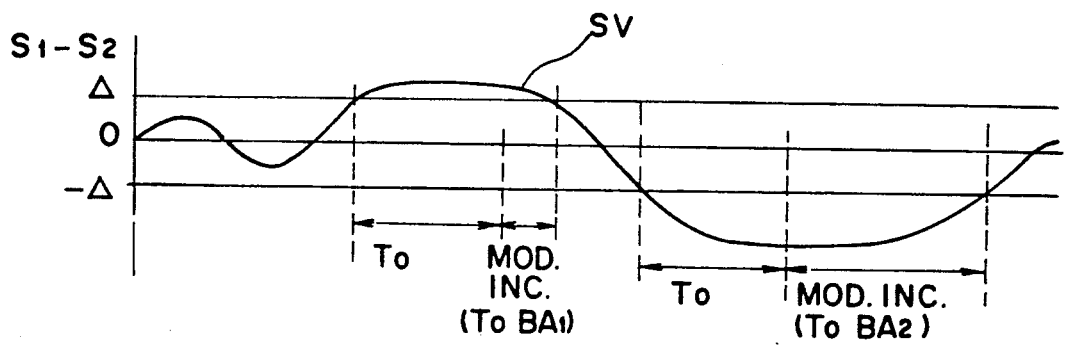

As shown in FIG. 4, when the spin difference SV exceeds the positive threshold value $\Delta$, a timer starts its counting operation, and if the count exceeds To, the moderate increase command is outputted. The outputting of the moderate increase command is ended when the spin difference SV attains a value smaller than the positive threshold value $\Delta$. When the moderate increase command ends, the counter is reset.

Where the spin difference SV takes a negative value, the braking force controller BC1' merely monitors the spin difference SV with no actual operation performed. The braking force controller BC2' operates in a manner similar to the braking force controller BC1'.

However, it may be arranged such that the braking force controllers BC1' and BC2' can be formed as a unitary braking force controller BC'. In such a case, the timer starts counting when the spin difference SV exceeds the negative threshold value $\Delta$ in the negative direction. When the timer has counted to To, the moderate increase command is outputted to the brake actuator $BA_2$. Thereafter, the outputting of such a moderate increase command is ended when the spin difference SV becomes closer to zero than the negative threshold value $\Delta$. When the moderate increase command ends, the counter is reset. Also, it may be arranged that, instead of immediately resetting the counter, it may be counted backwards when the spin difference SV becomes smaller than the threshold value $\Delta$ and ends its count-down operation when it is counted to zero.

EXAMPLE (2)

Figure 5:
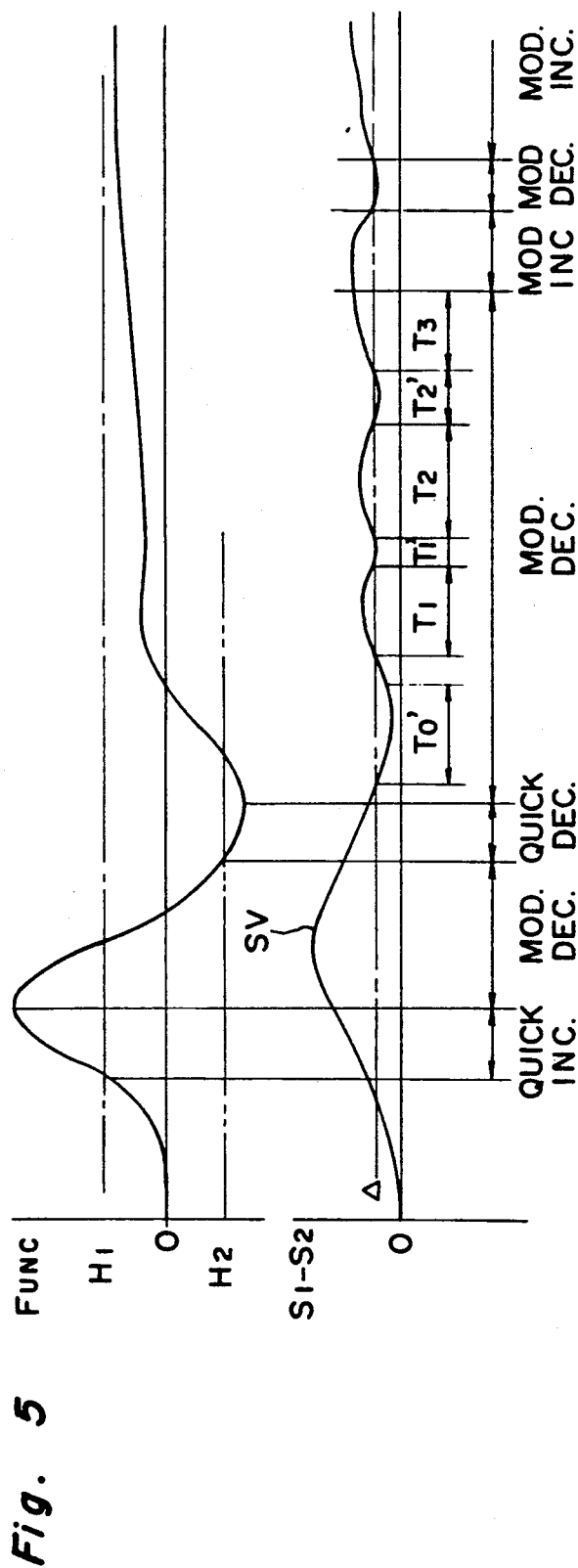
FIG. 5 is a graph showing waveforms obtained from the system of FIG. 1 according to Example (2)

As shown in FIG. 5, the spin difference SV and the threshold value $\Delta$ are compared with each other, and the times $T_1$, $T_2$ and $T_3$, during which the spin difference SV has exceeded the threshold value $\Delta$, are added up to obtain a count value $\Sigma T_i$. While in the meantime, the times $T_1'$, $T_2'$ and $T_3'$, during which the spin difference SV takes a value below the threshold value Δ are separately added to determine a count value ΣTi'. The count values ΣTi and ΣTi' are then compared with each other. If the difference, ΣTi−ΣTi', of these count values is greater than a predetermined difference To, the moderate increase command is generated for a period of time in which the spin difference SV exceeds the threshold value Δ. Then, in the even that the spin difference SV does not exceed the threshold value Δ for a period longer than the predetermined period To', the count values ΣTi and ΣTi' are reset to permit the counting from the beginning.

The above can be expressed by the following equations. First, it is detected that, $$To < T_1 + T_2 + \ldots - (T_1' + T_2' + \ldots) \qquad (1)$$

When the term $2(T_1' + T_2' + \ldots)$ is added to both sides terms of the above equation, the following equation can be obtained:

$$To + 2(T_1' + T_2' + \ldots) < T_1' + T_2' + \ldots + T_1' + T_2'$$

Assuming that:

$$T = T_1 + T_2 + \ldots + T_1' + T_2' + \ldots,$$

T represents a total length of time from the setting of either one of the times. If this equation is inserted in the above equation, the following equation is obtained, and therefore, equation (1) can be expressed using ΣTi' and T:

$$To + 2(T_1' + T_2' + \ldots) < T$$

The program steps #12-1 to #12-11 shown in the flow chart of FIG. 6 illustrate the decision made in this Example (2). Referring now to the flow chart of FIG. 6, Ta stands for a time count difference between the time during which the spin difference SV exceeds the threshold value Δ and the time during which it is not in excess of the threshold value Δ, and Tb stands for a time count during which the spin difference SV is lower than the threshold value Δ, and it is used for resetting the timer for counting Ta. It is to be noted that, when the timer count Ta attains a maximum value, for example, 255 counts, it retains the maximum counts until it is reset. This equally applies to the timer count Tb. Hereinafter, the program steps #12-1 to #12-11 for the decision made in this Example (2) will be sequentially described.

At step #12-1, a decision is made to determine if the spin difference SV is greater than the threshold value Δ. If the spin difference SV is greater than the threshold value Δ, the count Tb is rendered to be zero at step #12-2, but if it is smaller than the threshold value Δ, the count Tb is incremented by one at step #12-3. Thereafter, a decision is made at step #12-4 to determine if the count Tb is greater than the predetermined value To'. If the count Tb is found greater than the predetermined value To', the program flow proceeds to step #12-5 to make the count Ta equal to zero and further to step #12-6, but if the count Tb is found smaller than the predetermined value To', the program flow directly proceeds to step #12-6.

At step #12-6, a decision is made again to determine if the spin difference SV is greater than the threshold value Δ. If the spin difference SV is greater than the threshold value Δ, the program flow proceeds to step #12-9 at which the count Ta is incremented by one, and then to step #12-10, but if it is smaller than the threshold value the program flow proceeds to step #12-7. At step #12-7, if it is detected that the count Ta is zero, the program flow proceeds immediately to step #12-10, but if it is detected that the count Ta is not zero, the program flow proceeds to step #12-10 after the count Ta has been decremented by one at step #12-8.

At step #12-10, the count Ta and the predetermined value To are compared with each other, and, if the count Ta is found to be smaller than the predetermined value To, the program flow proceeds to step #15 to generate the moderate decrease command, but if it is greater than the predetermined value To, the program flow proceeds to step #12-11 at which a decision is made to determine if the spin difference SV is greater than the threshold value Δ. If the spin difference SV is found to be greater than the threshold value Δ at step #12-11, the moderate increase command is generated at step #14, but if it is found to be smaller than the threshold value Δ, the moderate decrease command is generated at step #15.

The foregoing is the operation carried out in braking force controller BC1', and the operation carried out in braking force controller BC2' is similar to that described above except the sign for SV being reversed.

EXAMPLE (3)

While in Example (2), the control has been described as carried out on the basis of the aggregated time during which the spin difference SV has exceeded the threshold value Δ and the aggregated time during which the spin difference SV has been reduced below the threshold value Δ, the following Example (3) is carried out with the use of an integrated value of the spin difference SV with respect to the threshold value Δ taken as a center axis. More specifically, $$\int_O^T (SV - \Delta) \cdot dt > \Delta'$$

and, hence, $$\int_O^T (SV \cdot dt - \Delta \cdot T > \Delta'$$

is determined, and the moderate increase command is generated during a period in which the above equation is satisfied and, at the same time, the spin difference SV exceeds the threshold value Δ.

The time at which the integration terminates, that is, the time at which the resetting takes place, is when the period in which the spin difference does not exceed the threshold value has continued for a length of time greater than the predetermined period To', and the time at which the integration starts is when the spin difference has exceeded the threshold value for the first time subsequent to the resetting.

In each of Examples (1), (2) and (3), the threshold value Δ is preferably selected. For example, if DSPIN in the equation of the control variable FUNC is rendered to be zero, that is, $$FUNC = K_2 \cdot SPIN$$

the threshold value Δ may take a value smaller than the SPIN value which would cause the control variable FUNC to exceed the positive threshold value $H_1$. In other words, the threshold value Δ is selected to be smaller than $H_1/K_2$.

Also, the threshold value Δ, as well as the threshold values $H_1$ and $H_2$, is preferably so selected as to be of a value approaching a predetermined value when the vehicle running speed is relatively low, but as to progressively increased so as to approach a predetermined value relative to the vehicle running speed when the vehicle running speed is relatively high.

Figure 7:
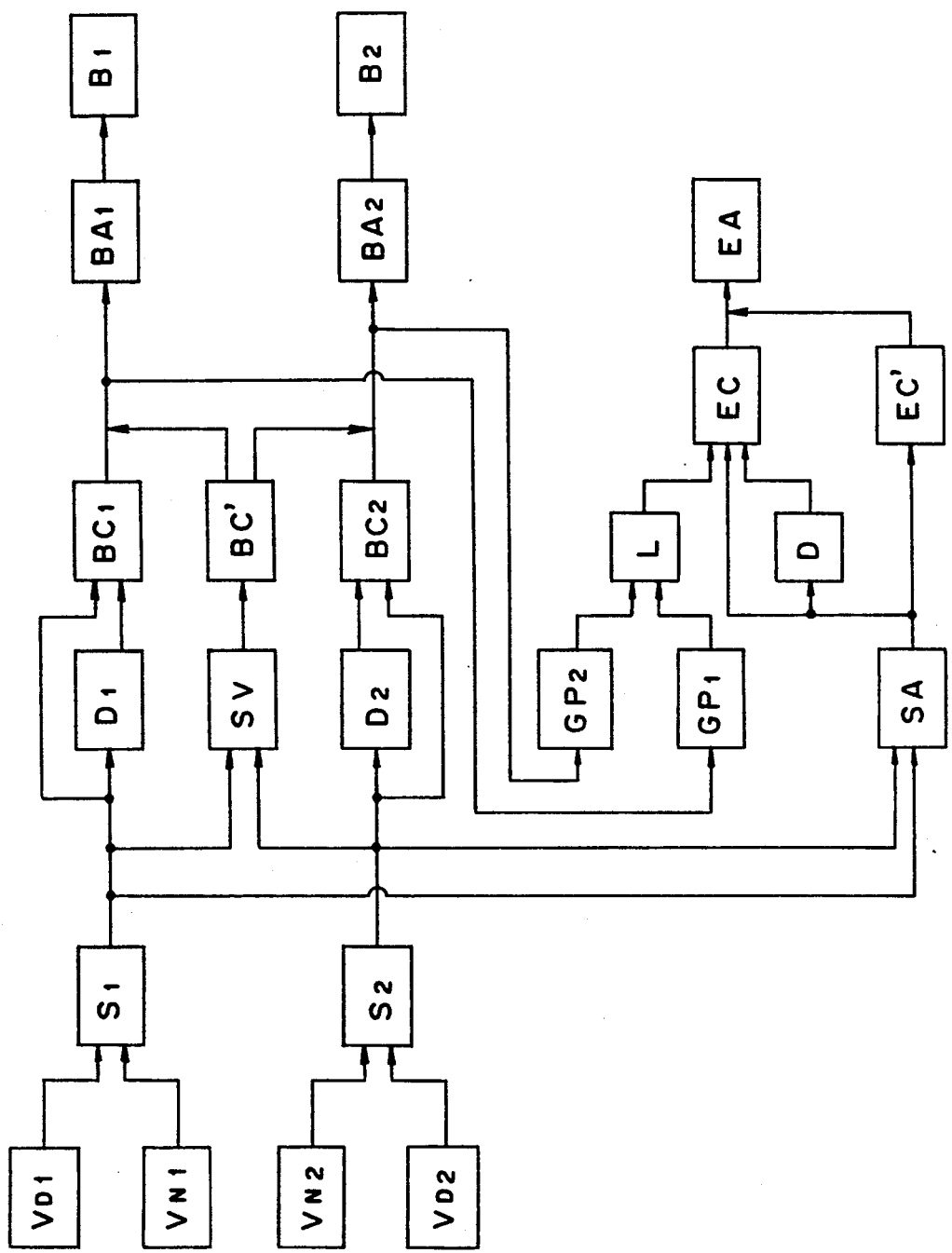
FIG. 7 is a circuit block diagram according to another embodiment of the present invention which is applied to a traction control system having both the braking force control and the driving force control.

FIG. 7 illustrates an example in which the second control means of the present invention is applied also to the driving force suppressing control of the traction control. It is to be noted that the upper half of the drawing of FIG. 7 pertains to the braking force control, reference to which has already been made.

Reference character EC represents a normal control portion of the driving force suppressing control. While numerous methods can be contemplated for the normal control, the example is herein illustrated in which a control substantially similar to the normal control portion of the braking force control is carried out in relation to an average difference SA with a differential component added, if necessary. An inference of the level of the braking force is carried out by a block GP with reference to an output value of the braking force control BC. A smaller one of the two inferred braking force levels obtained from the left and right sides of the automotive vehicle is selected at block L, thereby to effectuate the driving force control through the engine.

The essence of the present embodiment lies in the integrating control EC'. Since this is similar to BC' in the braking force control, except that the spin difference in this example is the average spin difference SA, it is obvious that the integrating control system discussed in connection with any one of the Examples (1), (2) and (3) can be equally applicable without being altered.

Figure 8:
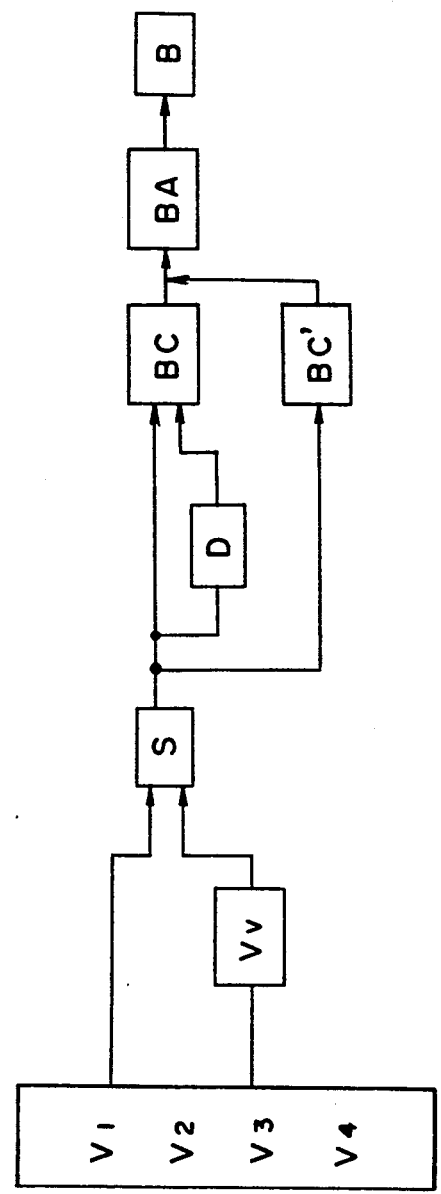
FIG. 8 is a circuit block diagram according to a further embodiment of the present invention which is applied to an anti-lock control system.

FIG. 8 illustrates an example in which the present invention is applied to the anti-lock control. According to the anti-lock control, the vehicle running speed Vv is inferred from the behavior of each of the wheels, an a difference between the inferred speed Vv and the rotational speed of each of the wheels is taken as a target to be controlled. It is, however, to be noted that, although only one channel is illustrated in FIG. 8, what is shown therein is in practice required in a number equal to the number of control channels. The number of the channels may be one, two, three or four and, in any event, it is well known in the art.

The anti-lock control is carried out during deceleration of the vehicle, while the previously described traction control is carried out during the acceleration of the vehicle, and therefore, care must be paid to the sign of each of the variables. However, the same idea can be basically applicable to both of them. In other words, based on the difference between the vehicle running speed and the rotations speeds of the wheels and its differential value, the normal control BC is carried out.

BA is employed in the form of a pressure reducing actuator in place of a pressurizing actuator used in the traction control. While the second control means BC' according to the present invention is provided in combination with the normal control BC, the constitution thereof may be identical with that described in connection with any one of Examples (1), (2) and (3), provided that the sign receives thoughtful consideration.

As hereinbefore fully described, since according to the present invention the integrating control (such as in any one of Examples (1), (2) and (3)) is carried out, the moderate generation of the difference which cannot be detectable only with the normal control can be quickly and assuredly detected.

Although the present invention has been described in connection with the preferred embodiments thereof with reference to the accompanying drawings, it is to be noted that various changes and modifications are apparent to those skilled in the art. By way of example, in the foregoing description of the present invention made with reference to the entire drawings, the target of the differentiating operation D has been shown as the difference S. However, since the vehicle running speed providing the criterion for the difference, that is, the differential value of any of the rotational speed of the non-driven wheels and the inferred vehicle running speed is small, the target of the differentiating operation may be directed to the rotational speeds of the driven wheels, not to the difference, and also to the rotational speed of each of the wheels in the case of the anti-lock. In any event, whichever is convenient for the calculation can be employed.

Also, although as a representative example of the normal control a system has been illustrated wherein the difference component and the differential component are compounded into a single function for the comparison with the threshold value, the normal control may not be always limited to such system, but may be a system wherein a combination of results obtained by coordinating the threshold values with the difference and differential components, respectively.

Accordingly, such changes and modifications are to be understood as included within the scope of the present invention as defined by the appended claims, unless they depart therefrom.

What is claimed is:

1. A wheel speed control apparatus for use in a vehicle having a driven wheel driven by an engine, said wheel speed control apparatus comprising:
   a spin detecting means for detecting a spin amount of said driven wheel;
   a control variable producing means for producing a control variable FUNC which is a function of said spin amount and a differential of said spin amount;
   first comparator means for comparing said control variable FUNC with first and second threshold levels in which the first threshold level is greater than the second threshold level;
   quick increase signal producing means for producing a quick increase signal under a first condition obtained when said control variable FUNC exceeds said first threshold level and until said control variable FUNC attains a positive peak point to quickly increase a braking effect of said driven wheel;
   quick decrease signal producing means for producing a quick decrease signal under a second condition obtained when said control variable FUNC falls below said second threshold level and until said control variable FUNC attains a negative peak point to quickly decrease said braking effect of said driven wheel; and
   a moderate control signal producing means for producing a moderate control signal when said control variable FUNC is other than said first and second conditions to moderately change said braking effect of said driven wheel.

2. A wheel speed control apparatus for use in a vehicle having at least first and second driven wheels driven by an engine, said wheel speed control apparatus comprising:
- a first spin detecting means for detecting a spin amount of said first driven wheel;
- a second spin detecting means for detecting a spin amount of said second driven wheel;
- a control variable producing means for producing a control variable FUNC which is a function of said spin amount and a differential of said spin amount;
- first comparator means for comparing said control variable FUNC with first and second threshold levels in which the first threshold level is greater than the second threshold level;
- quick increase signal producing means for producing a quick increase signal under a first condition obtained when said control variable FUNC exceeds said first threshold level and until said control variable FUNC attains a positive peak point to quickly decrease said braking effect of said driven wheels;
- quick decrease signal producing means for producing a quick decrease signal under a second condition obtained when said control variable FUNC falls below said second threshold level and until said control variable FUNC attains a negative peak point to quickly increase a braking effect of said driven wheels;
- spin difference producing means for producing a spin difference signal representing a difference between said spin amounts of said first and second driven wheels;
- second comparator means for comparing said spin difference signal with a predetermined reference level; and
- a moderate control signal producing means for producing, when said control variable FUNC is other than said first and second conditions, a moderate control signal according to a result of said second comparator means to moderately change said braking effect of said driven wheels.

3. A wheel speed control apparatus as claimed in claim 2, wherein said moderate control signal is produced to suppress the braking effect of said driven wheels.

4. A wheel speed control apparatus for use in a vehicle having at least first and second driven wheels driven by an engine, said wheel speed control apparatus comprising:
- a first spin detecting means for detecting a spin amount of said first driven wheel;
- a second spin detecting means for detecting a spin amount of said second driven wheel;
- spin difference producing means for producing an absolute spin difference signal $|S1-S2|$ representing an absolute value of a difference between said spin amounts of said first and second driven wheels;
- comparator means for comparing said absolute spin difference signal with a predetermined reference level; and
- moderate increase signal producing means for producing a moderate increase signal relative to a time when said absolute spin difference signal is greater than said predetermined reference level, whereby said moderate increase signal is used for moderately increasing the braking effect of at least one of said driven wheels.

5. A wheel speed control apparatus as claimed in claim 4, wherein said moderate increase signal producing means produces the moderate increase signal when a sum of periods of time when said absolute difference signal $|S1-S2|$ exceeds said predetermined reference level becomes greater than a predetermined reference time length.

6. A wheel speed control apparatus as claimed in claim 4, wherein said moderate increase signal producing means produces the moderate increase signal when a sum of periods of time when said absolute difference signal $|S1-S2|$ exceeds said predetermined reference level becomes greater, by a predetermined time length, than a sum of periods of time during said absolute difference signal $|S1-S2|$ falls below a predetermined reference level.

7. A wheel speed control apparatus as claimed in claim 4, wherein said first spin detecting means is a first subtractor for subtracting a speed of said first driven wheel from a speed of a non-driven wheel provided on the same side of said first driven wheel, and said second spin detecting means is a second subtractor for subtracting a speed of said second driven wheel from a speed of a non-driven wheel provided on the same side of said second driven wheel.

8. A wheel speed control apparatus as claimed in claim 7, wherein said first and second subtractors produce a value zero when the subtracted result shows a negative value.

9. A wheel speed control apparatus as claimed in claim 4, wherein said braking effect is produced by a brake system applied to said first and second driven wheels.

10. A wheel speed control apparatus as claimed in claim 4, wherein said moderate increase signal is produced only when said absolute spin difference signal is greater than said predetermined reference level.

11. A wheel speed control apparatus as claimed in claim 4, further comprising:
- spin information signal producing means for producing a spin information signal relative to at least one of said spin amounts obtained from said first and second spin detecting means;
- comparator means for comparing said spin information signal with a predetermined reference level;
- time integration means for adding time when said spin information signal exceeds said predetermined reference level and for subtracting time when said spin information signal falls below said predetermined reference level and wherein:
    said moderate increase signal producing means produces said moderate increase signal when the time integrated by said time integration means is greater than a predetermined amount of time and said moderate increase signal is used for moderately increasing the braking effect by an engine brake.

12. A wheel speed control apparatus as claimed in claim 11, wherein said spin information signal is an average between the spin amounts obtained from said first and second spin detecting means.

13. A wheel speed control apparatus as claimed in claim 11, wherein said spin information signal is a smaller one of the two spin amounts obtained from said first and second spin detecting means.

14. A wheel speed control apparatus for use in a vehicle having at least first and second driven wheels driven by an engine, said wheel speed control apparatus comprising:

a first spin detecting means for detecting a spin amount of said first driven wheel;

a second spin detecting means for detecting a spin amount of said second driven wheel;

spin difference producing means for producing a spin difference signal representing a difference between said spin amounts of said first and second driven wheels;

comparator means for comparing said spin difference signal with a predetermined reference level;

time integration means for adding time when said spin difference signal exceeds said predetermined reference level and for subtracting time when said spin difference signal falls below said predetermined reference level; and moderate increase signal producing means for producing a moderate increase signal when the time integrated by said time integration means is greater than a predetermined amount of time, whereby said moderate increase signal is used for moderately increasing the braking effect of at least one of said driven wheels.

15. A wheel speed control apparatus for use in a vehicle having at least first and second driven wheels driven by an engine, said wheel speed control apparatus comprising:

a first spin detecting means for detecting a spin amount of said first driven wheel;

a second spin detecting means for detecting a spin amount of said second driven wheel;

spin information signal producing means for producing a spin information signal relative to at least one of said spin amounts obtained from said first and second spin detecting means;

comparator means for comparing said spin information signal with a predetermined reference level;

time integration means for adding time when said spin information signal exceeds said predetermined reference level and for subtracting time during when said spin information signal falls below said predetermined reference level; and moderate increase signal producing means for producing a moderate increase signal when the time integrated by said time integration means is greater than a predetermined amount of time whereby said moderate increase signal is used for moderately increasing the braking effect of at least one of said driven wheel.

16. A wheel speed control apparatus as claimed in claim 15, wherein said braking effect is produced by an engine brake.

17. A wheel speed control apparatus as claimed in claim 16, wherein said spin information signal is an average between the spin amounts obtained from said first and second spin detecting means.

18. A wheel speed control apparatus as claimed in claim 16, wherein said spin information signal is a smaller one of the two spin amounts obtained from said first and second spin of the two spin amounts obtained from said first and second spin detecting means.

* * * * *